(12) United States Patent
Wakitani et al.

(10) Patent No.: US 6,958,549 B2
(45) Date of Patent: Oct. 25, 2005

(54) HYBRID TYPE DRIVING APPARATUS

(75) Inventors: Tsutomu Wakitani, Saitama (JP);
Toshiaki Kawakami, Saitama (JP);
Hiroshi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/831,181

(22) Filed: Apr. 26, 2004

(65) Prior Publication Data

US 2004/0227348 A1 Nov. 18, 2004

(30) Foreign Application Priority Data

May 16, 2003 (JP) .............................. 2003-138592

(51) Int. Cl.[7] .............................................. H02J 11/00
(52) U.S. Cl. .................. 290/40 C; 180/65.2; 180/65.4
(58) Field of Search ..................... 290/40 C; 180/65.2, 180/65, 65.4

(56) References Cited

U.S. PATENT DOCUMENTS

| | | | | |
|---|---|---|---|---|
| 5,172,784 A | * | 12/1992 | Varela, Jr. | 180/65.4 |
| 5,586,613 A | * | 12/1996 | Ehsani | 180/65.2 |
| 5,714,851 A | * | 2/1998 | Antony et al. | 318/148 |
| 5,722,502 A | * | 3/1998 | Kubo | 180/65.4 |
| 5,909,720 A | * | 6/1999 | Yamaoka et al. | 123/179.3 |
| 6,078,163 A | * | 6/2000 | Horie et al. | 320/104 |
| 6,083,139 A | * | 7/2000 | Deguchi et al. | 477/5 |
| 6,118,237 A | * | 9/2000 | Kikuchi et al. | 318/139 |
| 6,209,672 B1 | * | 4/2001 | Severinsky | 180/65.2 |
| 6,554,088 B2 | * | 4/2003 | Severinsky et al. | 180/65.2 |

FOREIGN PATENT DOCUMENTS

| | | | | |
|---|---|---|---|---|
| DE | 4118678 A1 | * | 12/1992 | B60K 6/04 |
| JP | 09121597 A | * | 5/1997 | H02P 9/04 |
| JP | 2001-161114 | | 6/2001 | |
| JP | 2002-223594 | | 8/2002 | |

* cited by examiner

Primary Examiner—Joseph Waks
(74) Attorney, Agent, or Firm—Westerman, Hattori, Daniels & Adrian, LLP

(57) ABSTRACT

An engine-driven generator G is concurrently used as a starter motor for an engine E that drives a working machine. A motor 25 for motive-power use is a driving source for the working machine to travel. The driving circuit 10 is commonly used between the starter motor G and the motor 25 for travel use. In a starting mode, with switches 35 and 36, the driving circuit 10 is connected to the starter motor G side to start the engine. After complete explosion of the engine, with the switches 35 and 36, the generator G is connected to a regulator 31, while the driving circuit 10 is connected to the motor 25 for travel use. As a result of this, while a battery 14 is electrically charged, the motor 25 for travel use is driven with the battery 14.

3 Claims, 5 Drawing Sheets

HYBRID TYPE DRIVING APPARATUS

BACKGROUND OF THE INVENTION

1. Field of the Invention

The present invention relates to a hybrid type driving apparatus that is equipped with an internal combustion engine and electric motor as the driving sources for a working machine, etc. and, more particularly, to a hybrid type driving apparatus that is constructed in such a way that a driving circuit can be commonly used between a motor that serves as the motive-power source for a working machine, etc. and a starter motor for the engine.

2. Description of the Related Art

In a working machine for agriculture use, there is known a so-called "hybrid" type engine-driven working machine that is constructed in such a way that the working machine can use the motive power of the engine and the motive power of a relevant motor. For example, in Japanese Patent Application Laid-Open No. 2001-161114, there is proposed a riding working machine that is constructed in the way that, in a case where the load of the working machine driven with an engine is small, the generator is driven with a surplus motive power of the engine and the surplus electric power of it is stored in a battery, where by, with the electric power that has been generated in the generator and the electric power that is supplied from the battery, the motors that are relevant to the working machine are driven. According to this riding working machine, since the load of the engine is maintained at all times high, it is possible to operate the engine with a high efficiency.

In the above-described hybrid type driving apparatus, it was necessary that driving circuits were respectively separately used for a starter motor for engine and for a motor that serves as a driving source for the working machine. When looking at from the viewpoint of simplifying this type of hybrid driving apparatus, by using as the starter motor the generator that serves as a motor and, at this time, commonly using an inverter circuit for starting and a regulator for the output of the generator partial common use of the circuits is certainly made (refer to Japanese Patent Application Laid-Open No. 2002-223594). However, the actual circumstance is that any contrivance has not yet been made when looked at from the viewpoint of commonly using the driving circuit.

SUMMARY OF THE INVENTION

In view of the above-described circumstances, an object of the present invention is to provide a hybrid type driving apparatus that enables simplifying the driving circuit to thereby simplify the electric-power control circuit.

To attain the above object, the present invention has a first characterizing feature in that a hybrid type driving apparatus, the hybrid type driving apparatus including a generator that is driven by an engine, a battery that is electrically charged by the generator, a motor for motive-power use, and a starter motor for the engine, comprises a driving circuit that drives the motor for motive-power use with an electric power that is supplied from the generator as well as from the battery, and switching means that when starting the engine connects the driving circuit to the starter motor. According to the first characterizing feature, by making common the paths of electric power supply from the sources of electric power supply to the motor for motive-power use and to the starter motor, the driving circuit can be commonly used between the motor for motive-power use and the starter motor. Therefore, the system of electric-power control circuit can be simplified and, in addition, the system of driving circuit becomes one and the same. Therefore, the apparatus has an increased level of reliability.

Also, the present invention has a second characterizing feature in that each of the motor for motive-power use and starter motor is a brushless motor that has a magnet rotor and three-phase stator windings; and the driving circuit has at least an inverter circuit. According to the second characterizing feature, since with respect to the motor for motive-power use and starter motor each of that is a brushless motor the source of electric power supply as well as the direction in which electric current is supplied is common, merely adjusting the amount of operation control for one relevant inverter circuit enables appropriately controlling both of them.

Also, the present invention has a third characterizing feature in that the generator is a concurrently-used-as-a-motor generator that has the function of the starter motor.

Also, the present invention has a fourth characterizing feature in that the apparatus further comprises a regulator that regulates the output electric power of the generator so that the output electric power can be used for electrically charging the battery; and the switching means is constructed so that, after complete explosion of the engine, it may disconnect the generator from the driving circuit and connect the generator to the regulator. According to the fourth characterizing feature, after complete explosion of the engine, the output electric power of the generator that is driven with the engine is adjusted by the regulator to be supplied to the battery. Accordingly, the motor for motive-power use can be driven only after the engine has been subject to complete explosion. This can avoid driving the motor for motive-power use only with an electric battery power when the working place is in an environment where electrical discharging is liable to occur in the battery.

Also, the present invention, in addition to the fourth characterizing feature, has a fifth characterizing feature in that the apparatus is constructed in the way that the driving circuit is connected to the motor for motive-power use. According to the fifth characterizing feature, while the battery is electrically charged through the operation of the engine, after complete-explosion of the engine the motor for motive-power use is connected to the driving circuit and thereby becomes able to be driven.

Further, the present invention has a sixth characterizing feature in that the apparatus is constructed in the way that the engine is operated so that it may be maintained at a fixed number of revolutions for a fixed speed to thereby drive a working machine; and the motor for motive-power use drives the working machine to travel. According to the sixth characterizing feature, the working machine is fixed-speed driven by the engine, while the load of the engine becomes able to be properly maintained with adjusting the travel speed of the working machine.

DETAILED DESCRIPTION OF THE PREFERRED EMBODIMENTS

Figure 2:
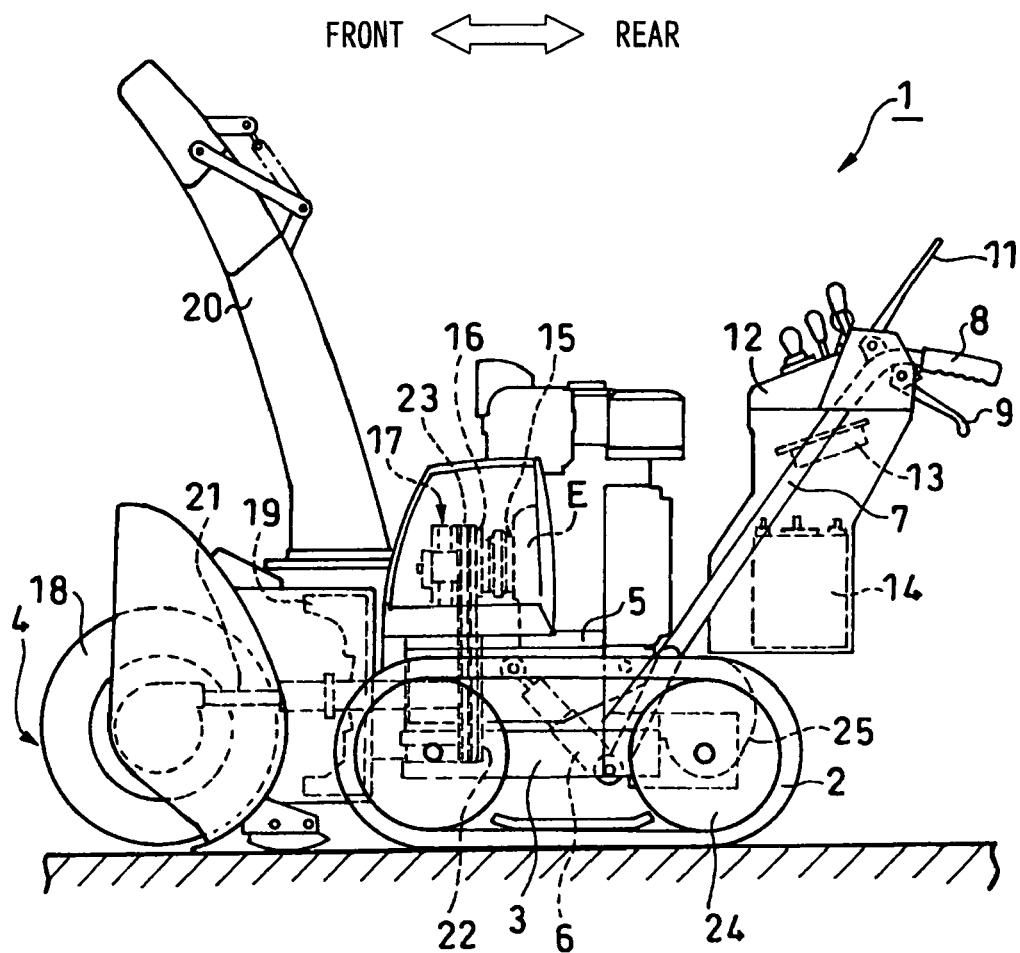
FIG. 2 is a left side view of a snowplow that includes the driving apparatus according to the embodiment of the present invention.

Hereinafter, an embodiment of the present invention will be explained in detail with reference to the drawings. FIG. 2 is a side view of a snowplow that serves as an engine-driven type working machine according to the embodiment of the present invention. The snowplow 1 comprises a travelling part frame 3 that is equipped with left and right crawlers 2. To this travelling part frame 3 there is attached a snow plowing body 4 as well as a vehicle body frame 5 that is equipped with an engine E that drives that snow plowing body 4, so that they can be swung up and down. The engine E drives the snow plowing body 4 that serves as the working machine by being controlled so that the engine E may be operated at a fixed number of revolutions for a fixed speed. A frame-elevating mechanism 6 swings the vehicle body 5 up and down by raising and lowering a frontward portion of the vehicle body 5. To the travelling part frame 3 there are connected left and right operation handles 7 that extend in the direction that is rearward and upward from that frame 3.

The operation handle 7 is the one by means of which the operator operates the snowplow 1. It has a grip 8 at its forward end and has in the vicinity of the grip 8 a swivel operation lever 9 for the snowplow 1. On the left one of the operation handles 7 there is provided a brake operation lever 11, while, on the right one of them, there is provided a clutch operation button (not illustrated) Between the left and right operation handles there are sequentially provided from the upside an operation board 12, control part 13, and battery 14 in the way that these are arrayed.

To an output shaft 15 of the engine E there are provided a drive pulley 16 and electromagnetic clutch 17. The snow plowing body 4 comprises an auger 18, blower 19, and shooter 20 that are provided in front of the vehicle body frame 3. It has a rotating shaft 21 that rotates the auger 18 and blower 19. To the rotating shaft 21 there is connected a driven pulley 22.

The motive power of the engine E is transmitted to the drive pulley 16 through the electromagnetic clutch 17 and is transmitted to the driven pulley 22 through a belt 23. As a result of this, the auger 18 and blower 19 are rotated through the rotating shaft 21, whereby the snow that has been scraped up by means of the auger 18 is sent into the shooter 20 and is blown far away.

The left and right crawlers 2 of the vehicle body have drive wheels 24 that are driven by a motor 25 for travel-of-working-machine use (i.e. the motor 25 for use for travelling of the working machine). The left and right drive wheels 24 are connected to the motor 25 for travel use via a clutch, not illustrated, that connects and disconnects the motive power from the motor 25 for travelling use. The motor 25 for travel use is a permanent magnet synchronous motor wherein permanent magnets for magnetic-field use are provided in the rotor and three-phase armature windings are provided in the stator, and which is driven and controlled by a driving circuit 10, as later described, that is equipped with an inverter circuit, in other words, a brushless motor.

Figure 3:
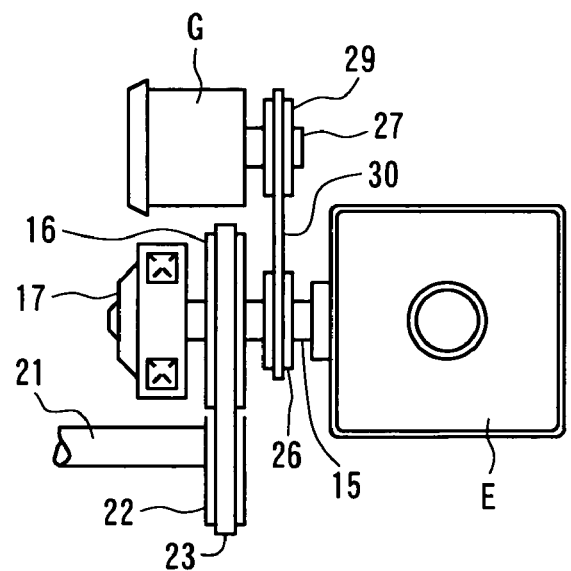
FIG. 3 is a main part plan view of the snowplow.

FIG. 3 is a main part plan view of the snowplow 1, especially the engine and generator. In FIG. 3, the generator G is disposed adjacently to the engine E. To the output shaft 15 of the engine E, there is provided a pulley 26 for generator use and, to an input shaft 27 of the generator G, there is provided a driven pulley 29. Between the pulley 26 and pulley 29, there is stretched a belt 30. Thereby, the motive power of the engine E is transmitted to the input shaft 27 of the generator G.

Figure 4:
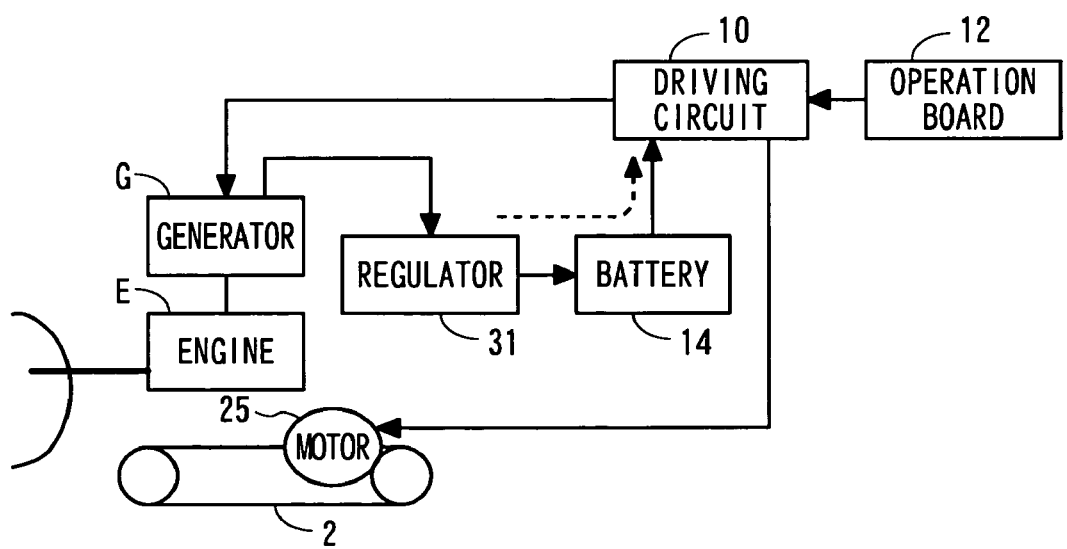
FIG. 4 is a block diagram illustrating the entire system of the snowplow.

FIG. 4 is a block diagram illustrating the entire system of the snowplow 1. In this figure, the same reference numerals and symbols as those in FIGS. 2 and 3 denote the same, or equivalent, components. In this figure, the generator G that is connected to the engine E is a permanent magnet synchronous machine, in which permanent magnets are provided in the rotor; and armature windings are provided in the stator, and which is similar to the motor 25 for travel use. This generator G is concurrently used as a starter motor for starting the engine E. The driving circuit 10 is for the purpose of controlling the generator G and the motor 25 for travel use. It is equipped with an inverter circuit. The battery 14 is used as a motive-power source for driving each of the generator G and the motor 25 for travel use. A regulator 31 is provided that is used when the electric power that has been generated in the generator G charges the battery 14. To the driving circuit 10, there is connected the operation board 12. The operation board 12, by its being operated by a relevant operator, outputs a command signal to start, and a command signal to stop, the engine E, as well as a command signal that regards the travel speed of the snowplow 1 and a command signal that regards the travel direction of it.

At the time of starting the engine E, an electric power is supplied from the battery 14 to the generator G by way of the driving circuit 10. This generator G acts as the starter motor. On the other hand, after the engine E is started up, the electric power of the generator G driven by the engine E charges the battery 14. Further, the output of the regulator 31, or the electric power that has been accumulated in the battery 14, is supplied to the motor 25 for travel use via the driving circuit 10. The regulator 31 adjusts the voltage of the electric power that is stored into the battery 14. In this way, the driving circuit 10 is commonly used both for driving the generator G that serves as the starter motor and for driving the for-use-for-travelling motor 25.

Figure 1:
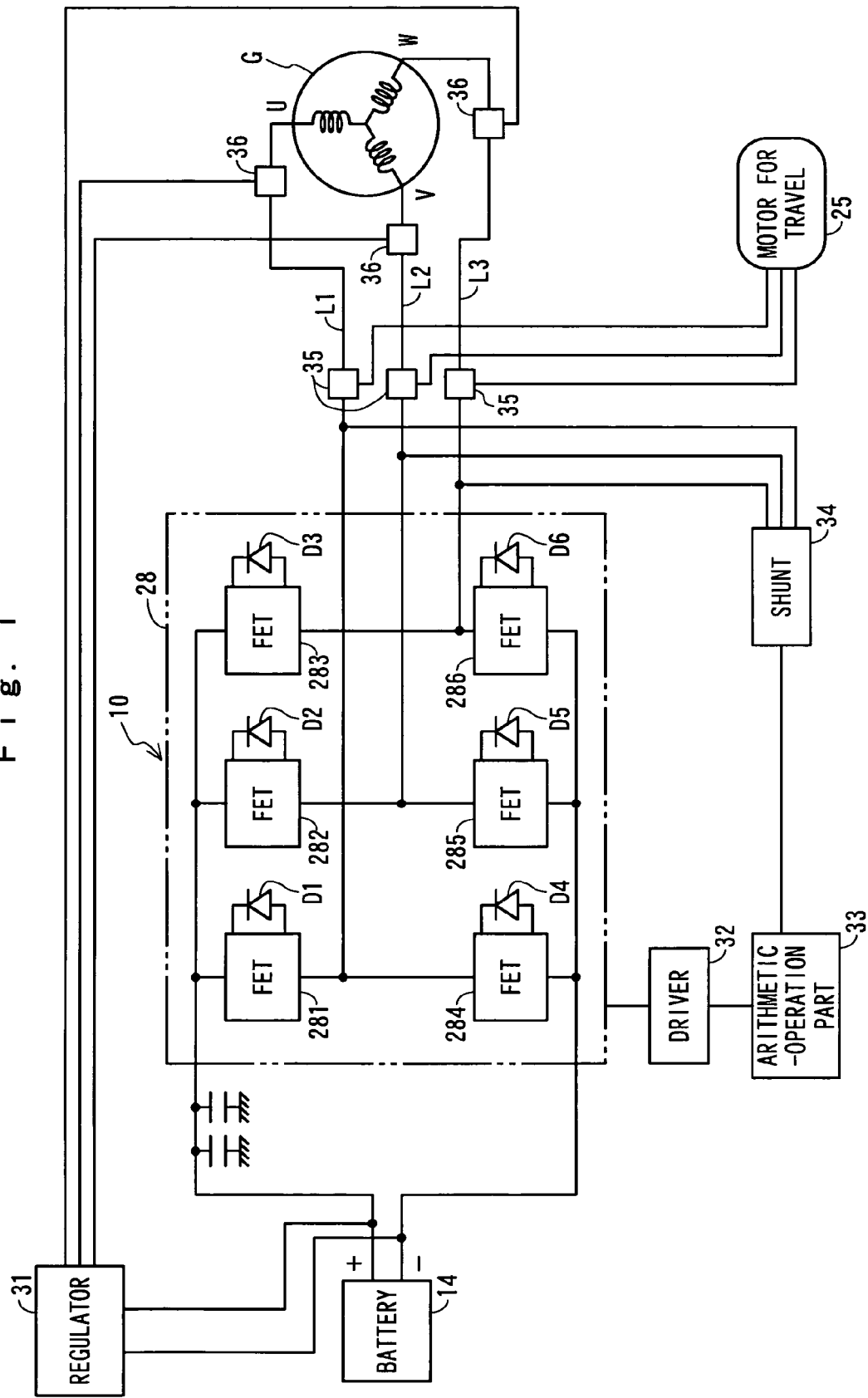
FIG. 1 is a main part circuit diagram of a driving apparatus according to an embodiment of the present invention.

Subsequently, the driving circuit 10 and the changing-over control for making common use of this driving circuit 10 will be explained. FIG. 1 is a circuit diagram illustrating a main part of the driving apparatus according to this embodiment. In this figure, the driving circuit 10 includes a switching circuit 28 that composes an inverter, a driver 32 that drives the switching circuit 28, an arithmetic-operation (calculation) part 33, and a shunt 34.

The switching circuit 28 includes six MOSFETs, i.e. metal oxide semiconductor field effect transistors (hereinafter referred to simply as "the FETs") 281 to 286. On the upper side there are disposed the FETs 281 to 283, and on the lower side there are disposed the FETs 284 to 286. To the FETs 281 to 286, there are connected fly-back diodes D1, D2, D3, D4, D5, and D6, respectively. The driver 32 applies a driving voltage to the gates of the FETs 281 to 286.

The driver 32, in a case where using the generator G as the starter motor, sequentially applies a driving voltage to each of the gates of the FETs 281 to 286. The arithmetic-operation (calculation) part 33 that can be constructed of a digital signal processor determines the period in which the driving-voltage signal is generated from the driver 32, i.e. the period in which the FETs 281 to 286 are changed over, to output a relevant signal to the driver 32. The arithmetic-operation part 33 further detects the rotor position according to the value of electric current that flows through each phase of the generator G and that is detected through the shunt 34.

In the driving apparatus, there are also provided switches or relays 35 and 36 for selectively connecting the driving circuit 10 with respect to the generator G or the motor 25 for motive-power use. The switches 35 and 36 are respectively provided on the lines L1, L2, and L3 that are led out from the three-phase stator windings of each of the generator G and motor 25 for motive-power use. These switches are changed over through the use of a relevant command that is issued from the operation board 12 that has been instructed.

In the driving apparatus, there is also provided a control part (not illustrated) that performs over-all controls that are over the change-over for the switches 35 and 36 that is performed in such a way as to follow the instruction made from the operation board 12, the operation of the driver 32 for driving the switching circuit 28, and the operation of the arithmetic operation part 33. This control part can be constructed using a microcomputer, and a main part of the processing will later be described with reference to a relevant flow chart.

FIGS. 5A to 5E are views each illustrating an example of the changed-over states of the switches 35 and 36, and the switches 35 and 36 that are provided on the line L1 represent the switches on the other lines L2 and L3.

Figure 5:
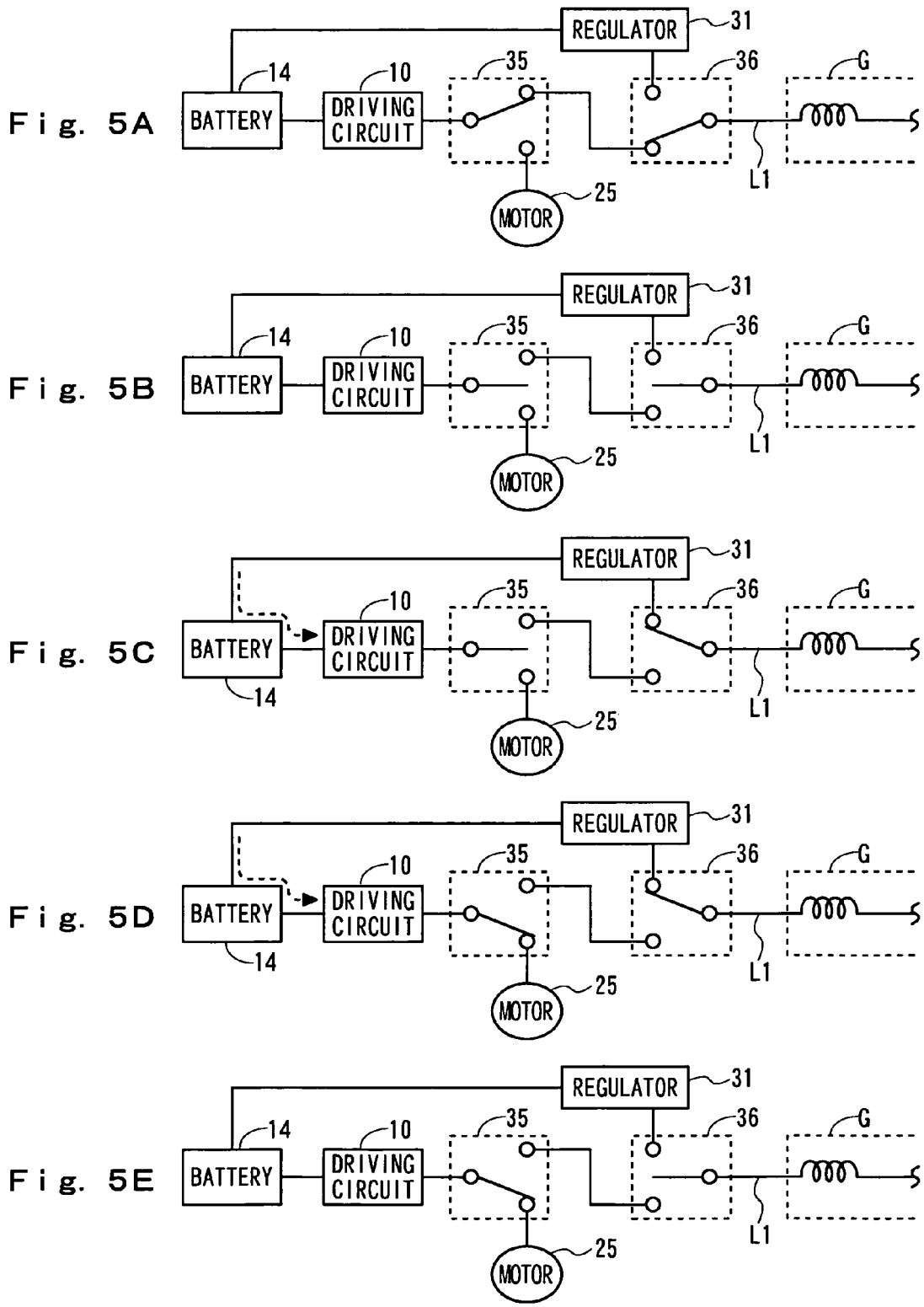
FIGS. 5A to 5E are views each illustrating changed-over state of switches.

In FIG. 5A, there are illustrated the positions of the switches 35 and 36 that are taken when the engine is started up. The switches 35 and 36 are changed over so that the driving circuit 10 may be connected to the generator G, thereby the generator G is driven by the driving circuit 10.

In FIG. 5B, there are illustrated the positions of the switches 35 and 36 that are taken after the engine has been started up. The switches 35 and 36 are changed over to their respective neutral positions (their respective "off" positions), and the engine E makes its independent operation.

In FIG. 5C, there are illustrated the positions of the switches 35 and 36 that are taken when the battery is electrically charged. The switch 35 is changed over to its neutral position, while the switch 36 is changed over to the regulator side. Accordingly, the motor 25 for travel use is not driven and the battery 14 has charged therein the electric power that has been generated in the generator G that has been driven by the engine E.

In FIG. 5D, there are illustrated the positions of the switches 35 and 36 that are taken when the snowplow 1 is caused to travel. The switch 35 is changed over to the motor 25, for travel use, side, while the switch 36 is changed over to the regulator 31 side. Accordingly, while the battery 14 is electrically charged with the electric power that has been generated in the generator G that has been driven by the engine E, the motor 25 for travel use is driven by the electric power of the battery 14 and the electric power that is supplied through the regulator 31.

In FIG. 5E, there are illustrated the positions of the switches 35 and 36 that are taken, or located, when the snowplow 1 is caused to travel during the stop of the engine. The switch 35 is changed over to the motor for travel use side, while the switch 36 is changed over to its neutral position. Accordingly, during the stop of the engine, the motor 25 for travel use is driven with the battery 14.

Figure 6:
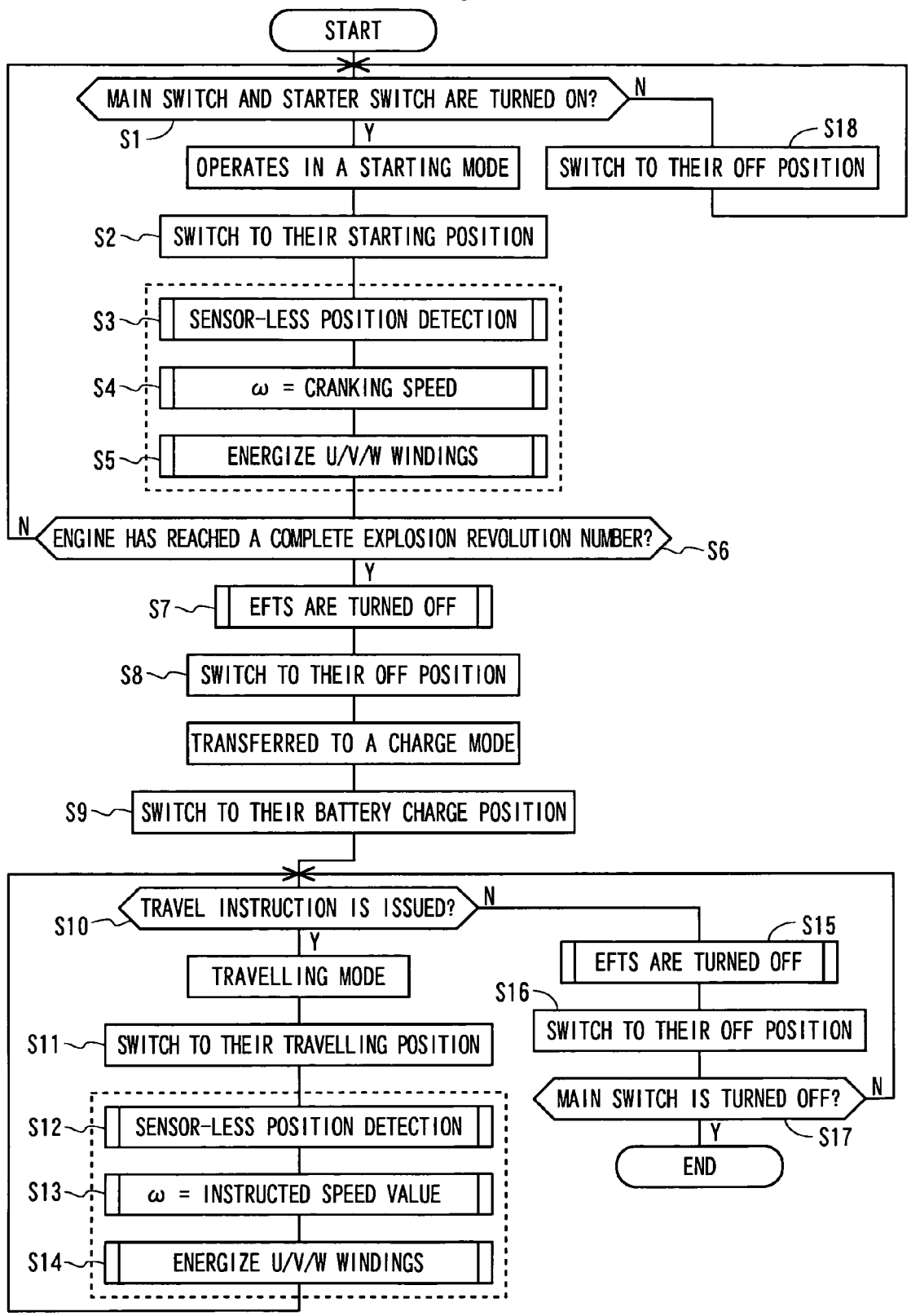
FIG. 6 is a flow chart illustrating a main part of the processing executed in the driving apparatus according to the embodiment of the present invention.

FIG. 6 is a control flow chart illustrating the control of the driving apparatus according to this embodiment. In a step S1, it is determined whether a main switch has been turned on and a starting switch has also been turned on. The main switch and starting switch are provided on the operation board 12. When "on" determination is made in the step S1, the driving apparatus operates in a starting mode. First, in a step S2, the switches 35 and 36 are changed over to their positions (FIG. 5A) that they take when starting the engine. When the switches 35 and 36 are changed over to their positions that they take when starting the engine, in steps S3 to S5 the generator G is driven as the starter motor for the engine E.

First, in the step S3, sensor-less position detection processing is performed. When operating as a motor, the generator G is driven through the performance of a sensor-less control that doesn't detect the magnetic-polar position of the rotor with a position sensor. Namely, when starting up the engine, the controller estimates the magnetic-polar position of the rotor according to the relative electric current of each phase of the generator G. For example, the controller estimates the magnetic-polar position of the rotor from the ratio between the amounts of electric current that flow through the U and W phases. During the rotation, as well, of the rotor, the magnetic-polar positions of the rotor continue to be similarly detected. This system of startup is known as "a vector control". Every operation from the time of startup to during the stationary operation may be controlled, using detection signals of all relevant sensors, by providing a magnetic sensor for detecting the magnetic-polar position of the rotor, etc. The electric current in each phase is detected via the shunt 34.

In a step S4, the controller sets a target revolution speed ω of the engine to a predetermined cranking speed. In a step S5, according to the magnetic-polar position of the rotor that is determined from the relevant phase of the generator G, the controller controls the FETs of the switching circuit 28, and the controller causes to supply an electric current to the U-, V-, and W-phase windings of the generator G so that the engine E may be revolved at the speed of cranking.

In a step S6, it is determined whether the engine E has reached a complete explosion number of revolutions for independent rotation. The number of revolutions of the engine E can be detected according to the period of the electric current signal waveform of the generator G. Since if the number of revolutions of the engine E has reached the complete-explosion one the engine E can independently revolve, the flow proceeds to a step S7, in which all of the FETs 281 to 286 of the switching circuit 28 are turned off. In a step S8, the both switches 35 and 36 are changed over to the "off" position (FIG. 5B).

Once the engine E has started its independent revolution, the driving apparatus is transferred to an electrically charging mode for battery. And, in a step S9, the switches 35 and 36 are respectively changed over to their positions (FIG. 5C) that are taken when electric charging is performed. In a step S10, it is determined whether an instruction to cause the snowplow 1 to travel has been issued. When in the electrically charging mode an instruction for travel has been input from the operation part 12 during the operation, the apparatus is transferred to a travelling mode. In the travelling mode, in a step S11, the switches 35 and 36 are changed over to their positions of FIG. 5D, with the result that the motor 25 for travel use is driven. The driving sequence (steps S12 to S14) for the motor 25 for travel use is the same as the one that is performed when driving the generator G as the starter motor, namely the one that is performed in the preceding steps S3 to S5. However, in the step S13, the target revolution speed ω of the engine is set to the number of revolutions that is determined by the instructed travel speed value of the snow plow 1.

When "no" determination is made in the step S10, namely no instruction for travel is issued, the flow proceeds to a step S15, in which all of the FETs 281 to 286 of the switching circuit 28 are turned off so that no electric current may be supplied to the motor 25 for travel use as well as to the U-, V-, and W-phase windings of the generator G. In a step S16, the both switches 35 and 36 are brought to their "off" positions.

In a step S17, it is determined whether the main switch has been turned off. Then, until the main switch is turned off, the flow proceeds to the step S10, in which it goes on being determined whether an instruction for travel has been issued. When the main switch has been turned off, the processing is terminated.

When it has been determined in the step S1 that the main switch has not yet been turned off, in a step S18 the both switches 35 and 36 are brought to their "off" positions, and the controller stops all the processing.

As has been described above, in the present embodiment, it has been arranged that the driving circuit 10 be able to be commonly used between the generator G that is concurrently used as the starter motor and the motor 25 for travel use. Since it is arranged that the generator G also function as the starter motor, it is arranged that the switches 35 and 36 can also be changed over to the regulator 31 side as well. However, the present invention is not limited to a mode in which the driving circuit is commonly used between the generator functioning concurrently as the starter motor as well and the motor for travel use. In cases, as well, where a starter motor that is provided separately from the generator and another motor make common use of the driving circuit, the present invention can be applied there to.

Incidentally, the driving circuit 10 can also be compacted as a driving-circuit unit in which the regulator 31, and also the switches 35 and 36, are integrated together.

Without being limited to being used for the snowplow, the present invention can widely be applied as a hybrid type driving apparatus for the working machines, such as a lawn mower, a plower, or a cultivator, each of that is equipped with an engine-driven generator, a motor for motive-power use, such as the one for travel use, that is driven the electric power of the generator, and a starter motor for the engine.

As will be apparent from the fore going explanation, according to the present invention, since the starter motor and the motor for motive-power use can make common use of the driving circuit, it is possible to achieve simplification of the circuit construction. Also, by making the driving circuit into a unitary one, the reliability on the driving apparatus as a whole can be enhanced.

According to the present invention, the motor for motive-power use and the starter motor, each of that is a brushless motor, is appropriately controlled simply by adjusting the amount of control for the operation of the inverter circuit.

According to the present invention, by concurrently using the generator as a generator and a starter motor, the construction simplification can be achieved.

According to the present invention, the battery is electrically charged with the output electric power of the generator. According to the present invention, the motor for motive-power use is driven when the generator is being operated, so it is possible to prevent the motor for motive-power use from being driven with the electric power of the battery only.

According to the present invention, the working machine is fixed-speed driven through the operation of the engine, so the load of the engine becomes able to be properly maintained with adjusting the travel speed of the working machine.

What is claimed is:

1. A hybrid type driving apparatus, the hybrid type driving apparatus including a generator that is driven by an engine, a battery that is electrically charged by the generator, a motor for motive-power use, wherein the generator can operate as a starter motor for starting the engine, comprising:
    a regulator that regulates the output electric power of the generator to appropriately fit for charging the battery;
    a driving circuit that drives the motor for motive-power use and the generator as the starter motor by an output of the battery,
    a switching means that only when starting the engine connects the output of the driving circuit to the generator to operate it as the starter motor; wherein
    the switching means is configured so as to disconnect the generator from the driving circuit then connects the generator to the battery via the regulator after start up of the engine, and connects the battery to the motor for motive-power use via the driving circuit that is disconnected from the generator, while the generator that is disconnected from the driving circuit is connected with the battery via the regulator.

2. A hybrid type driving apparatus according to claim 1, wherein
    each of the motor for motive-power use and the generator is a brushless type electrodynamic machine that has a magnet rotor and three-phase stator windings; and
    the driving circuit has at least an inverter circuit.

3. A hybrid type driving apparatus according to claim 1, wherein it is constructed in the way that the engine is operated so that it may be maintained at a fixed number of revolutions for a fixed speed to thereby drive a working machine.

* * * * *